United States Patent
Anagnos (10) Patent No.: US 11,140,509 B2
(45) Date of Patent: Oct. 5, 2021

(54) HEAD-TRACKING METHODOLOGY FOR HEADPHONES AND HEADSETS

(71) Applicant: Daniel P. Anagnos, Annapolis, MD (US)

(72) Inventor: Daniel P. Anagnos, Annapolis, MD (US)

(*) Notice: Subject to any disclaimer, the term of this patent is extended or adjusted under 35 U.S.C. 154(b) by 0 days.

(21) Appl. No.: 17/004,793

(22) Filed: Aug. 27, 2020

(65) Prior Publication Data

US 2021/0067896 A1   Mar. 4, 2021

Related U.S. Application Data

(60) Provisional application No. 62/892,169, filed on Aug. 27, 2019.

(51) Int. Cl.
| | |
|---|---|
| *H04S 7/00* | (2006.01) |
| *H04R 3/00* | (2006.01) |
| *G06F 3/01* | (2006.01) |

(52) U.S. Cl.
CPC ............ *H04S 7/304* (2013.01); *G06F 3/012* (2013.01); *H04R 3/00* (2013.01)

(58) Field of Classification Search
CPC ... H04S 7/00; H04S 7/30; H04S 7/302; H04S 7/303; H04S 7/304; H04S 1/002; H04S 2420/01; H04S 2400/01; H04R 3/00; H04R 3/12; H04R 5/00; H04R 5/02; H04R 5/04; G06F 3/012
See application file for complete search history.

(56) References Cited

U.S. PATENT DOCUMENTS

| | | | |
|---|---|---|---|
| 7,215,782 B2* | 5/2007 | Chen | H04S 1/002 381/17 |
| 8,320,592 B2* | 11/2012 | Kim | H04R 5/04 381/310 |

(Continued)

FOREIGN PATENT DOCUMENTS

WO   2018154143   8/2018

OTHER PUBLICATIONS

International Search Report and Written Opinion for PCT/US20/48191 dated Nov. 20, 2020.

*Primary Examiner* — Thang V Tran
(74) *Attorney, Agent, or Firm* — Peter A. Nieves; Sheehan Phinney Bass & Green PA (57) ABSTRACT

Head-tracking comprises remixing audio input data or channels to discrete device audio reproduction channels, to alter the audio input data or channels' perceived location in 3D space, in a manner compensating for relative head movement (compensatory manner), based upon provided head location data. Phase (delay) of the desired audio input data or channels is altered to shift the perceived sonic image location in 3D space, in a compensatory manner that correlates to a desired location relative to a designated device reference point. Amplitude of the desired audio input data or channels is altered to shift a perceived sonic image location in 3D space, in a compensatory manner that correlates to the desired location relative to the designated device reference point. Altering phase (delay) is performed using a constant delay function for each of the desired audio input data or channels that is independently varied based on current head location data.

13 Claims, 5 Drawing Sheets

(56) References Cited

U.S. PATENT DOCUMENTS

| | | | |
|---|---|---|---|
| 2006/0062410 A1* | 3/2006 | Kim | H04S 7/302 |
| | | | 381/310 |
| 2012/0008789 A1* | 1/2012 | Kim | H04S 3/002 |
| | | | 381/17 |
| 2012/0020502 A1 | 1/2012 | Adams | |
| 2012/0213375 A1* | 8/2012 | Mahabub | H04S 5/00 |
| | | | 381/17 |
| 2017/0188172 A1 | 6/2017 | Horbach | |
| 2017/0257721 A1* | 9/2017 | Kasuga | G10L 21/055 |
| 2017/0257724 A1 | 9/2017 | Bosnjak et al. | |
| 2017/0353812 A1* | 12/2017 | Schaefer | H04R 3/04 |
| 2017/0366913 A1* | 12/2017 | Stein | G10L 19/008 |
| 2020/0059724 A1* | 2/2020 | Walther | H04S 7/303 |
| 2020/0374646 A1* | 11/2020 | Lee | H04S 7/00 |

\* cited by examiner

| 0° to 60° (RIGHT) HEAD ROTATION | | 0.0000 | 2.0000 | 4.0000 | 6.0000 | 8.0000 | 10.0000 |
|---|---|---|---|---|---|---|---|
| Source Rotation (Degrees): | | 0.0000 | -2.0000 | -4.0000 | -6.0000 | -8.0000 | -10.0000 |
| Input | | | | | | | |
| L Channel | Position on Unit Circle | 330.0000 | 328.0000 | 326.0000 | 324.0000 | 322.0000 | 320.0000 |
| | Reproduction Ch 1 (S1) | Ls2 | Ls2 | Ls2 | Ls2 | Ls2 | Ls2 |
| | Reproduction Ch 2 (S2) | L | L | L | L | L | L |
| | Delay, msec | 0.0000 | 0.5230 | 1.0348 | 1.5347 | 2.0220 | 2.4962 |
| | Attenuator 1 (L), dB | 0.0000 | -0.3367 | -0.6492 | -0.9410 | -1.2147 | -1.4728 |
| | Attenuator 2 (R), dB | -∞ | -∞ | -∞ | -∞ | -∞ | -∞ |
| | Attenuator 3 (Ls$_2$), dB | -∞ | -28.3990 | -22.8508 | -19.7709 | -17.6869 | -16.1392 |
| R Channel | Position on Unit Circle | 30.0000 | 28.0000 | 26.0000 | 24.0000 | 22.0000 | 20.0000 |
| | Reproduction Ch 1 (S1) | L | L | L | L | L | L |
| | Reproduction Ch 2 (S2) | R | R | R | R | R | R |
| | Delay, msec | 0.0000 | 0.1708 | 0.3307 | 0.4796 | 0.6173 | 0.7435 |
| | Attenuator 1 (R), dB | 0.0000 | -0.3503 | -0.7017 | -1.0555 | -1.4127 | -1.7746 |
| | Attenuator 2 (L), dB | -∞ | -28.0623 | -22.2015 | -18.8299 | -16.4722 | -14.6663 |
| | Attenuator 3 (Rs$_2$), dB | -∞ | -∞ | -∞ | -∞ | -∞ | -∞ |
| C Channel | Position on Unit Circle | 0.0000 | 358.0000 | 356.0000 | 354.0000 | 352.0000 | 350.0000 |
| | Reproduction Ch 1 (S1) | L | L | L | L | L | L |
| | Reproduction Ch 2 (S2) | R | R | R | R | R | R |
| | Delay, msec | 1.3522 | 1.3461 | 1.3277 | 1.2969 | 1.2540 | 1.1989 |
| | Attenuator 1 (L), dB | -6.0206 | -5.5105 | -5.0276 | -4.5679 | -4.1282 | -3.7057 |
| | Attenuator 2 (R), dB | -6.0206 | -6.5625 | -7.1420 | -7.7660 | -8.4435 | -9.1860 |
| | Attenuator 3 (Ls$_2$), dB | -∞ | -∞ | -∞ | -∞ | -∞ | -∞ |
| | Attenuator 4 (Rs$_2$), dB | -∞ | -∞ | -∞ | -∞ | -∞ | -∞ |
| Ls$_1$ Channel | Position on Unit Circle | 270.0000 | 268.0000 | 266.0000 | 264.0000 | 262.0000 | 260.0000 |
| | Reproduction Ch 1 (S1) | Ls2 | Ls2 | Ls2 | Ls2 | Ls2 | Ls2 |
| | Reproduction Ch 2 (S2) | L | L | L | L | L | L |
| | Delay, msec | 8.7410 | 8.7304 | 8.6984 | 8.6452 | 8.5709 | 8.4754 |
| | Attenuator 1 (L), dB | -6.0206 | -6.1975 | -6.3785 | -6.5643 | -6.7556 | -6.9532 |
| | Attenuator 2 (Ls$_2$), dB | -6.0206 | -5.8472 | -5.6768 | -5.5089 | -5.3430 | -5.1785 |
| Rs$_1$ Channel | Position on Unit Circle | 90.0000 | 88.0000 | 86.0000 | 84.0000 | 82.0000 | 80.0000 |
| | Reproduction Ch 1 (S1) | R | R | R | R | R | R |
| | Reproduction Ch 2 (S2) | Rs2 | Rs2 | Rs2 | Rs2 | Rs2 | Rs2 |
| | Delay, msec | 8.7410 | 8.7304 | 8.6984 | 8.6452 | 8.5709 | 8.4754 |
| | Attenuator 1 (R), dB | -6.0206 | -5.8472 | -5.6768 | -5.5089 | -5.3430 | -5.1785 |
| | Attenuator 2 (Rs$_2$), dB | -6.0206 | -6.1975 | -6.3785 | -6.5643 | -6.7556 | -6.9532 |
| Ls$_2$ Channel | Position on Unit Circle | 210.0000 | 208.0000 | 206.0000 | 204.0000 | 202.0000 | 200.0000 |
| | Reproduction Ch 1 (S1) | Rs2 | Rs2 | Rs2 | Rs2 | Rs2 | Rs2 |
| | Reproduction Ch 2 (S2) | Ls2 | Ls2 | Ls2 | Ls2 | Ls2 | Ls2 |
| | Delay, msec | 0.0000 | 0.1708 | 0.3307 | 0.4796 | 0.6173 | 0.7435 |
| | Attenuator 1 (Ls$_2$), dB | 0.0000 | -0.3503 | -0.7017 | -1.0555 | -1.4127 | -1.7746 |
| | Attenuator 2 (L), dB | -∞ | -∞ | -∞ | -∞ | -∞ | -∞ |

HEAD-TRACKING METHODOLOGY FOR HEADPHONES AND HEADSETS

CROSS-REFERENCE TO RELATED APPLICATIONS

This application claims the benefit of U.S. Provisional Patent Application Ser. No. 62/892,169, filed Aug. 27, 2019, entitled "Head-Tracking Methodology for Headphones and Headsets," which is incorporated by reference herein in its entirety. This application also incorporates by reference in its entirety, co-pending utility patent application entitled, "Headphone Device for Reproducing Three-Dimensional Sound Therein, and Associated Method," having Ser. No. 16/998,206, filed Aug. 20, 2020.

FIELD OF THE INVENTION

The present invention is related to high quality audio reproduction, and particularly to the reproduction of three-dimensional (3D) sound through use of head-tracking.

BACKGROUND OF THE INVENTION

The quality of reproduced audio continues to improve. One audio characteristic that is highly desired is the providing of 3D audio, also referred to as 3D sound, where 3D or spatial characteristics are reproduced. Providing 3D audio in headphones is more difficult than with high performance loudspeaker systems. Generating a 3D audio experience similar to that possible with high performance loudspeakers using headphone type devices is conventionally termed "3D Audio Virtualization" and is an area of intense research in academia and product development in today's audio industry.

In headphones and headsets that attempt to create a realistic perception of three-dimensional (3D) space outside of the listener's head, a method usually is required to prevent the 3D sonic image from moving with the listener's head. If the 3D sonic image shifts position or rotates with the listener's head position, as is universally common with headphones, the sonic illusion will not be maintained. When listening to loudspeakers, the sonic image will not move or rotate as the listener changes their head position, provided that the listener remains centered within the loudspeaker setup configuration (stereo or multi-channel). Of course, this is not the case with headphones.

This limitation with headphone listening is caused by the transducers (which reproduce the sound) being physically mounted on and moving with the listener's head—unlike loudspeakers which do not move with the listener. For applications that rely upon stable, external, 3D sonic imaging, such as simulators, virtual reality (VR) and augmented reality (AR), gaming, home theater and professional studio monitoring, it is essential that this limitation be mitigated in headphones—especially if the goal of the headphones is to replicate the immersive listening experience of high performance loudspeaker systems.

The most common solution to the problem of a spatial image moving with the listener's head is to employ a "head-tracking" system. Head-tracking is generic terminology for describing a dynamic system that tracks the position of the listener's head in order to apply some form of signal processing compensation. Once the listener's head position is determined, signal processing (usually a digital signal processor (DSP)) can shift the sonic image in a compensatory manner such that the perception of the listener is that the sonic image did not shift or move.

There are a number of problematic issues with many head-tracking solutions. The most common problems include: data from head-tracking sensors is inaccurate or drifts over time, leading to erroneous information regarding the true position of the listener's head at any point in time; the speed of the overall head-tracking system—including measurement and signal processing compensation—is too slow for dynamic, real-time applications, resulting in a loss of synchronization between head position and compensation; and the signal processing damages the audio signal quality, due either to excessive manipulation or improper processing techniques.

These problems may result in a serious degradation of the headphone listening experience and a failure to create or maintain a believable 3D sonic image outside of the listener's head. Especially for professional audio applications, the head-tracking system must not compromise the source audio quality or the correlation to an external studio monitoring experience using loudspeakers. Similarly, virtual reality and augmented reality applications demand that the 3D sonic experience closely track the 3D visual experience in order to promote and maintain believability.

Therefore, there is a need in the industry to address one or more of these issues.

SUMMARY OF THE INVENTION

Embodiments of the present invention provide a system and method for reproducing three-dimensional sound. Briefly described, a head-tracking method is provided, which is intended for headphone-type audio reproduction devices that utilize a dynamic (real-time variable) signal processing mix engine. The method comprising the steps of: remixing audio input data or channels to discrete audio reproduction channels present within a device, where the discrete audio reproduction channels feed or drive an associated audio transducer or speaker of the device, to alter the audio input data or channels' perceived location in 3D space, in a manner compensating for relative head movement, referred to herein as a compensatory manner, based upon provided user head location data, wherein phase (delay) of the desired audio input data or channels is altered to shift the perceived sonic image location in 3D space, in a compensatory manner that correlates to a desired location relative to a designated reference point of the audio reproduction device, wherein an amplitude of the desired audio input data or channels is altered to shift a perceived sonic image location in 3D space, in a compensatory manner that correlates to the desired location relative to the designated reference point of an audio reproduction device, wherein phase changes of the desired audio input data or channels are implemented through use of new constant delay values applied as a time delay stage prior to a standard audio mixer topology, wherein amplitude changes of the desired audio input data or channels are implemented through use of new gain/attenuation values that are applied to a standard audio mixer topology, and wherein the step of altering phase (delay) of the desired audio input data or channels is performed by use of a constant delay function, which is used for each of the desired audio input data or channels that is independently varied based on current user head location data.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIG. 3 shows the excerpt of an example data lookup table for the signal processing of FIG. 2.

DETAILED DESCRIPTION

The present system and method provides for determining relative motion of a listener's head, tracking this information dynamically, and compensating in real-time for any movement without compromising audio quality. The reproduced sonic image remains stable and avoids perceptual shifts that follow head movements. The present head-tracking methodology, when combined with, for example, the design concepts outlined within copending patent application Ser. No. 16/998,206, filed Aug. 20, 2020, entitled, "Headphone Device for Reproducing Three-Dimensional Sound Therein, and Associated Method", yields an accurate, high performance headphone/headset system appropriate for professional studio monitoring, VR/AR applications, gaming, home theater, simulation trainers, and more. Furthermore, the present system and method minimizes added complexity and cost within the system.

The present head-tracking system and method achieves the following key requirements for accuracy and high performance: accurately determines the listener's head position at any point in time and tracks relative movement in real-time; prevents drifting of positional information over time and environmental variation; combined head position measurement and compensatory processing operations are performed and maintained at a very high speed, resulting in a truly dynamic, synchronized, real-time system; and minimizes the complexity and degree of signal processing in order to avoid any audio degradation, e.g., fidelity losses and added distortion artifacts from excessive digital signal processing, undesired latency effects, and more.

Figure 1:
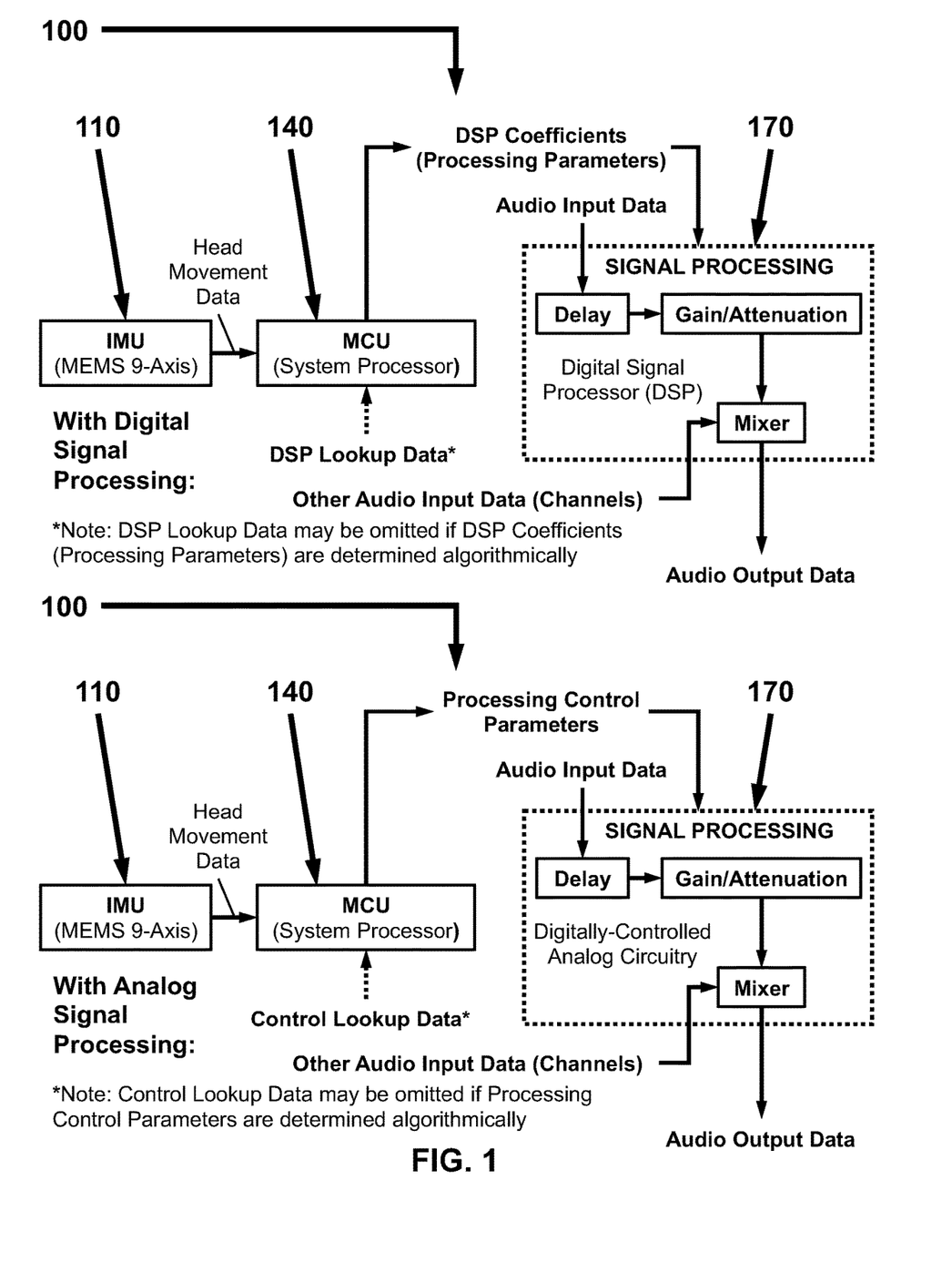
FIG. 1 is a schematic diagram illustrating the present head-tracking system, in accordance with a first embodiment of the invention.

FIG. 1 is a schematic diagram illustrating the present head-tracking system 100, in accordance with a first embodiment of the invention. As illustrated by FIG. 1, there are three main components to the present head-tracking system 100, namely, an inertial measurement unit (IMU) 110, a system processor (MCU) 140, and a signal processor 170, which can be a digital signal processor (DSP) or a digitally-controlled analog implementation. Referring to the IMU, which may be provided on an integrated circuit (IC), as is known by those having ordinary skill in the art, an IMU is an electronic device that measures and reports velocity, orientation and gravitational forces, using a combination of sensors, usually accelerometers, gyroscopes, and sometimes, magnetometers. An IMU works by detecting the current rate of acceleration of an object on which the IMU is located, using one or more accelerometers, and detects changes in rotational attributes, such as pitch, roll and yaw, using one or more gyroscopes. Certain IMUs also include a magnetometer, mostly to assist in calibration against orientation drift.

The present head tracking system 100 employs an integrated, integrated circuit (IC)-based 9-axis IMU 110 that calculates head movement data. The IMU 110 contains a 3-axis gyroscope, a 3-axis accelerometer, and a 3-axis magnetometer. It should be noted that other IMU configurations may be utilized, such as alternative types of IMU measurement or optical scanning, to obtain the raw, real-time data pertaining to the head position and orientation of a person using the present head-tracking system.

Head movement data calculated by the IMU 110 is sent to the system processor 140, where the system processor 140 either algorithmically calculates or looks up (in memory) new control values, parameters, or coefficients. The result of the system processor 140 calculation or lookup process is a signal processor 170 control signal, which is transmitted from the system processor 140 to the signal processor 170. Alternatively, the system processor 140 may simply transmit head movement data directly to the signal processor 170, which performs the algorithmic calculation or seeks lookup data itself. As is known by those having ordinary skill in the art, algorithms and lookup data queries can be performed in standard system processors (MCUs) as well as digital signal processors (DSPs) depending on the specific topology, devices and coding employed in the design. The signal processor 170 dynamically shifts a transducer-reproduced sonic (spatial) image to compensate for any user head movement. The signal processor 170 is implemented in a specific topology, for example functional processing stages for gain/attenuation adjustment, delay adjustment and mixing, required for the design outlined within the co-pending utility patent application entitled, Headphone Device for Reproducing Three-Dimensional Sound Therein, and Associated Method, and having Ser. No. 16/998,206 filed Aug. 20, 2020, which is incorporated herein by reference in its entirety. No additional processing is required for adding the head-tracking functionality to the processing outlined in the present description, which is described for a 0°, front-center listener orientation. As will be described in detail herein, the present head-tracking functionality, as performed by the IMU 110, system processor 140, and signal processor 170, alters processing values, parameters or coefficients for gain/attenuation and delay within the existing signal processor flow of a 3D audio processing system (functional blocks required for mix-down to output reproduction channels driving each transducer in the system, which includes gain/attenuation adjustment and delay adjustment for all audio input data or channels). In so doing, a sonic (spatial) image reproduced by the system's output transducers can be moved in 3D space by the same degree as—and in the opposite direction of—the head movement measured by the IMU 110.

As is known by those having ordinary skill in the art, headphones contain a headband. In accordance with the present invention, the IMU 110 integrated circuit (IC) is mounted at the centerline (0°) axis of the headphone's headband apex, with controlled reference orientation of the IMU IC's various sensor axes for three-dimensional cartesian space (X, Y and Z location in the spherical volume surrounding the head). Mounting of the IMU 110 integrated circuit, including a printed circuit board (PCB) on which the IC is mounted, must be very stable in order to avoid measurement errors.

In accordance with the present system and method, the IMU 110 is capable of measuring side-to-side (left-to-right), front-to-back and up-down (tilt) motion of the listener's head as well as angular rotation of the head. In accordance with the present invention, for most consumer and professional audio headphone and headset applications a relative measurement of head rotation is required, as a minimum, for effective head-tracking, although lateral, longitudinal and tilt (elevation) measurements could improve accuracy. A single IMU design in the preferred embodiment is optimized for measuring ±60° head rotation, which encompasses the normal physiological rotation capability of the human head, but up to ±180° rotational measurement is possible. This angle of head rotation measurement is important because it must accurately represent the actual rotation of the listener's head in real time and definitively locate the listener's ears relative to the 0° front-center reference location at any point in time; this is a fundamental requirement for effective head-tracking in 3D audio applications.

The IMU 110 may utilize common and known "dead-reckoning" position determination methods, whereby the process used by the IMU 110 for calculating the current head position of a user utilizes a previously determined reference position, or fix of the user's head (and IMU 110), and advances that position based upon known or estimated speeds of the user's head (and IMU 110) over elapsed time and course, based upon data from the IMU 110's various on-board sensors. In accordance with the present system and method, establishing a reference or baseline position that corresponds to a 0° (center), forward-facing orientation of the user's head is essential for determining the user's actual head position at any point in time in a head-tracking system that relies on relative measurements. It is possible to establish this reference automatically through software algorithms (running in a MCU or DSP) that average the IMU's on-board sensor data over a range of the user's head movement, or manually via a user interface function, e.g., a button press executed by the user when the head is oriented front-center. Once the 0° reference point is determined or set, relative movement measurements can be used by the present system and method to determine the position of the user's head (and ears). While "dead-reckoning" is a known and recognize method for determining position, other methods may be used, such as, but not limited to, use of a visual tracking system.

Head position data from the IMU 110 is averaged or low-pass filtered to minimize errors and large, sporadic deviations. The optimum averaging or low-pass filtering parameters must be determined experimentally, based upon the specific IMU type devices employed in a design to generate the raw head position data while adhering to the IMU 110 manufacturers' application recommendations for sufficient data stability and repeatability. To provide a general example, one may average 16 sensor readings of 3° incremental measurements (throwing out any measurements that are not a multiple of 3°) each fraction of a millisecond to arrive at a final data point; that data point is used as the actual head position for a specified point in time. This process would be continually repeated to provide a real-time stream of data representing head position over a span of time. It should be noted that this is a generic example only and will vary depending on the specific IMU 110 utilized in the design.

In accordance with a first exemplary embodiment of the invention, a centerline threshold of ±x° head rotation about the 0° (center) front-facing axis is established or determined by system developers based upon experimentation during the design and development process. For example, establishing a centerline threshold of 4° would require head rotation in excess of ±4° from the center axis before any processing changes are executed in the signal processor 170. An ideal threshold will minimize sensitivity issues (to insignificant head movements) during normal listening conditions, which must be determined within the context of a particular design implementation, IMU type, IMU location and application. The centerline threshold is controllable by the system processor (MCU) 140 through conventional interface protocols with the IMU 110, e.g., GPIO, SPI, I2C, etc. Generally, this threshold parameter could be stored in MCU 140 memory and sent to the IMU 110 during the boot process as a setup parameter. Alternatively, the MCU 140 could post-process the IMU 110 data to establish a desired threshold value before sending the final data to the signal processor 170.

Although very small rotational increments may be measurable by the IMU 110, it is beneficial to determine or establish incremental change thresholds, through repeated in-situ experimentation by the development team during the design process, in the context of a desired application (e.g., VR, home theater, professional monitoring), using a specified IMU 110 in a specified location in the overall device (headset), in order to minimize sensitivity to errors and insignificant head movements. A 2° rotational increment is recommended as an initial threshold based upon basic perceptual assumptions (the threshold must be small enough to avoid the perception of discrete shifts in the position of sonic images) but should be validated by controlled experimentation, as this may vary depending on application. Incremental thresholds should be controllable by the system processor 140 in the manner previously described, typically by storing that value and sending it to the IMU 110 during the setup or boot process as it is powered up. These threshold values are determined during development and set. Threshold values typically are not varied dynamically; however, such values can be changed or updated through conventional firmware upgrade processes used for ICs (such as USB update).

The IMU 110 design of the present system and method avoids the complexity and limitations of optical, line-of-sight scanning solutions that are prone to errors, drift and poor accuracy. However, the IMU 110 utilized in accordance with the present system and method is critically important for achieving 3D audio performance levels required.

The following is described for exemplary purposes specific to a low-power, mobile device, embodiment, and may vary for other applications, such as larger devices and tethered systems like VR headsets and simulators. In order for the present IMU 110 to ensure high levels of accuracy and audio performance for the present embodiment, the following optimal characteristics are required or desirable as noted. First, the IMU 110 should utilize 6-9 axes, specifically, 3-axis gyroscope+3-axis accelerometer (required)+3-axis magnetometer (desired but not required), where all axes are orthogonal X, Y and Z axes (required). Second, the IMU 110 should have minimal cross-axis sensitivity between the accelerometer, gyroscope and magnetometer axes of the IMU 110, which are required and necessary for acceptable accuracy and stability. Third, the IMU 110 is preferably a Micro Electro-Mechanical Systems (MEMS) device with integrated CMOS circuitry; ideal for low-power mobile applications (desired but not required). Fourth, the IMU 110 utilized should be a low power consumption (<10 mA) device, which is required for low-power mobile applications. An exemplary IMU 110 may be a 3 mm×3 mm×1 mm QFN package, or smaller, which is ideal for low-power mobile applications (desirable). Fifth, the IMU 110 should have high shock reliability for robustness (≥10,000 g), a requirement for mobile applications. Sixth, it is also beneficial for the IMU 110 to include self-test and sleep modes, which are ideal for low-power mobile applications (desirable but not required). Seventh, it is beneficial for the IMU 110 to include temperature measurement of the IC die on which the IMU is located, which is necessary and required for accuracy over time. Eighth, the IMU 110 is required to include user-programmable full-scale measurement ranges for all sensors (±°/sec, ±g, ±μT, etc.). It is noted that optimal range settings for IMU 110 must be determined experimentally during development of the overall head-tracking system, in the context of a desired application (e.g., VR, home theater, professional monitoring), using a specified IMU 110 device in a specified location in the overall device (headset). Changes to application, IMU 110 or location can vary the optimal settings.

As a ninth feature, the IMU 110 should include programmable digital filters for data output; this is desirable for simplifying the averaging or low-pass filtering of data previously described. In addition, as a tenth (desirable) feature, the IMU 110 should include flexible, high precision clocking options in order to simplify system design. As an eleventh feature, the IMU 110 is required to include a high speed I2C and/or SPI or similar serial communication interfaces to the system processor (MCU) 140, at 400 kHz or higher, to facilitate setup of the IMU 110 and data transfer to the MCU 140 and signal processor 170. As a twelfth feature, it is ideal and desired that the IMU 110 includes firmware for pre-determined motion-based functions such as "wake-up" to off-load and simplify MCU 140 requirements; otherwise, these functions would require development and coding in the MCU. Exemplary IMUs 110 include, for example, the InvenSense MPU-9250 and the STMicro LSM9DS1.

Any general purpose 8-bit or higher MCU (system processor) 140 can be utilized in the present system and method provided it has sufficient memory, processing speed and input/output interfaces for communicating, controlling (setup) and data transfer with the particular IMU 110 and signal processor 170 utilized in the design. These requirements must be determined based on the specific IMU 110 selected for the design. Moreover, it is desirable that the MCU 140 be a low power device (<100 mW) for applications that are mobile. To summarize the required functions of the MCU in the present system and method, it must provide setup parameters to/for the IMU 110 as required by the specific IMU 110 utilized and receive output data from the IMU 110 in the data format required by the IMU 110 utilized. To summarize desired functions of the MCU 140 in the present system and method, it should be able to dynamically control peripheral functions of the IMU 110 utilized, such as "sleep" and "wake up" modes to reduce power consumption, and enable firmware updates of the IMU 110 utilized, if available on the specified IMU 110.

Figure 2:
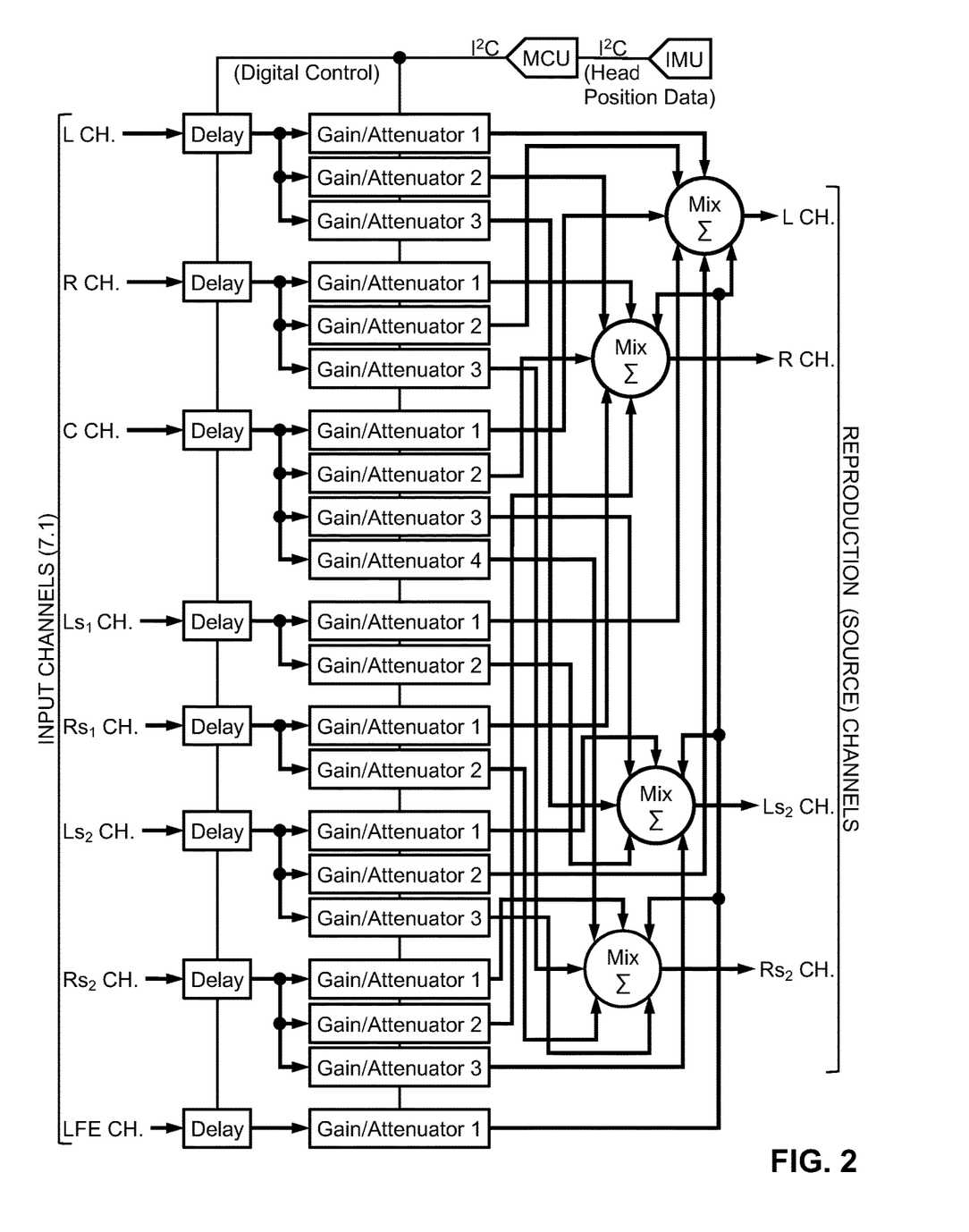
FIG. 2 is a schematic diagram illustrating a simplified digital signal processor (DSP) or digitally-controlled analog implementation in accordance with the present invention.

The signal processor 170 receives user head position data from the system processor 140, and performs sonic image processing in accordance with the present invention to shift the virtual spatial position of the original audio input's sonic image, reproduced by the output transducers. The sonic image processing, as performed by the signal processor 170, employs a dynamic, real-time mix engine consisting of independently variable gain/attenuation functions, independently variable delay functions and multichannel input/single output mixer functions, similar or identical in implementation to that required by and disclosed in co-pending utility application entitled "Headphone Device for Reproducing Three-Dimensional Sound Therein, and Associated Method", having Ser. No. 16/998,206, filed Aug. 20, 2020, which has been incorporated by reference in its entirety. This function is most efficiently realized by the signal processor 170 through digital signal processing (DSP), but alternatively could be implemented by digitally-controlled analog circuitry (in such an implementation, the digital control would be provided by the MCU 140). FIG. 2 is a schematic diagram illustrating a simplified signal processor 170, such as a DSP or digitally-controlled analog implementation, in accordance with the present invention, illustrating the real-time mix engine. The signal processor 170 contains four (4) discrete reproduction or "source" channels, which are required for the design of the signal processor 170, independent of the number of input channels (typically 2-8). Discrete reproduction channels are designated as L, R, $Ls_2$ and $Rs_2$. Only two (2) discrete reproduction or "source" channels, are required for the design of the signal processor 170 if input channels are limited to two (stereo).

A pair of any of the discrete reproduction (source) channels, hereto referred to as "Source Position (S1)" and "Source Position (S2)," are required and generate a virtual source position in the 3D space surrounding the listener's head. The S1 and S2 channel assignments are predetermined based upon clockwise (CW) rotation from the 0° center axis, with S1 and S2 being the two closest discrete reproduction channels that straddle (are adjacent to) the desired location of a new Virtual Source. Generation of a Virtual Source from S1 and S2 is based upon standard "Phantom Channel" mixing techniques, whereby the system processor (MCU) controls the aforementioned mixing functions of the signal processor 170 based upon the real-time IMU data it receives. The "control" of the signal processor 170 are values, parameters or coefficients that set gain/attenuation, delay and mixing parameters. In general, each Virtual Source is generated from the mix of two adjacent input channels, with independently controllable delay and gain/attenuation settings. The delay and gain/attenuation settings are required to accurately position the Virtual Source in the 3D space surrounding the listener' head, in accordance with co-pending utility application entitled "Headphone Device for Reproducing Three-Dimensional Sound Therein, and Associated Method", having Ser. No. 16/998,206, filed Aug. 20, 2020, which has been incorporated by reference in its entirety.

Referring back to FIG. 2, a Digital Control signal is provided, labelled as emanating from the MCU in FIG. 2, which is the MCU's outputted control signal (new values, parameters or coefficients) that alter the delay and gain/attenuation setting for each input channel in the signal processor 170. A Head Position Data output is provided, labelled as emanating from the IMU output in FIG. 2, which is the listener head position data as determined for a particular moment in time. The mix functions are standard multichannel input, single output audio mixers, with equal (or variable) gain for all channels. As is known by those having ordinary skill in the art, the previously mentioned variable gain/attenuation functions could be incorporated within the mix functions' inputs instead of as separate functions external to the mix functions, as shown in FIG. 2. In addition, reproduction source channels are the discrete output channels that drive or feed (after amplification) each of the system's output transducers (speakers). If a digital signal processor (DSP) is utilized for the mix function, these channels must be converted to analog prior to amplification.

Variable delays are required for each channel in order to reposition virtual sources properly onto an ITU-R (BS.775-2) 7.1 channel setup configuration. The specific delays required for the recommended 3 meter radius from the listener's head varies from 0 to 8.75 msec. Delays are required for any setup configuration, including stereo.

Gain/attenuation levels will not follow the standard "pan law" or "pan rule" for creation of phantom (virtual) channels since the mix is not intended for loudspeakers within a typical room. Near-ideal channel matching and the absence of acoustical reflections and reverb within the headphone's ear cup cavities, permit the use of mathematically "correct" gain/attenuation values rather than commonly-used pan laws.

When a specific mixer input channel is not utilized it will be fully attenuated (−∞ dB). When a source position corresponds to the position of one of the discrete reproduction channels only one input channel is required, and all other mixer inputs will be fully attenuated.

An external, 3D sonic image is perceived by the listener when a sound field is created by the combination of discrete and virtual source channels per, for example, co-pending utility application entitled "Headphone Device for Reproducing Three-Dimensional Sound Therein, and Associated Method", having Ser. No. 16/998,206, filed Aug. 20, 2020. By altering mix-down relationships, modifying the gains and delays of each input channel, as well as the resulting virtual output channel assignment, each channel can be moved within the virtual space surrounding the listener's head, for example, in accordance with the co-pending utility application entitled "Headphone Device for Reproducing Three-Dimensional Sound Therein, and Associated Method", having Ser. No. 16/998,206, filed Aug. 20, 2020, and in a manner conceptually similar to standard professional audio mixing procedures (this is the same procedure used for creating a virtual "center" channel using only left and right channels in a two-channel (stereo) release format).

A specific combination of virtual (and sometimes discrete) sound sources—e.g., a stereo pair or a 7.1 channel configuration—through use of the present system and method can be moved (reassigned) in 3D space by the same degree in the opposite direction of the resulting and measured head movement. For example, a +30° (CW or right) rotation of the head, would cause a corresponding −30° (CCW or left) rotation of the sound sources and generated sound field, which would result in the perception of zero net movement of the sonic image to the listener—the image remains oriented at 0° despite the +30° head rotation.

The values (or representative coded parameters associated with these values) for input channel delays and gain/attenuation levels for all head positions (i.e., rotation angles) can be precalculated (as shown later in FIG. 4, FIG. 5 and subsequent description of calculations) and stored within a data lookup table (in memory) used by the signal processor 170. The MCU 140 (or alternatively, the signal processor 170) will look up stored values of input channel delays and gain/attenuation levels (or the representative coded parameters associated with these values) for a particular head position received from the IMU 110 and send these to the signal processor 170, which will immediately update its processing values, parameters or coefficients for gain/attenuation, delay and mixing functions of all input and output channels.

Alternatively, a simple signal processing algorithm, running in the MCU 140 or signal processor 170 could calculate the values for input channel delays and gain/attenuation levels in real-time ("on-the-fly"), in the exact same manner as described subsequently. All of these operations will run much faster than the user's head position will change under normal conditions (generally less than 1000°/sec). FIG. 3 shows the excerpt of an example data lookup table for the signal processor 170. The data within this table would be used for digital control of a Digital Signal Processor (DSP), in the form of DSP coefficients or other required processing parameters. Alternatively, the data within this table would be used for digital control of analog circuitry, in the form of a serial or parallel control signal for specialized digitally controlled analog circuitry or ICs. All of the data shown in this table was calculated in accordance with the present system and method.

Figure 4:
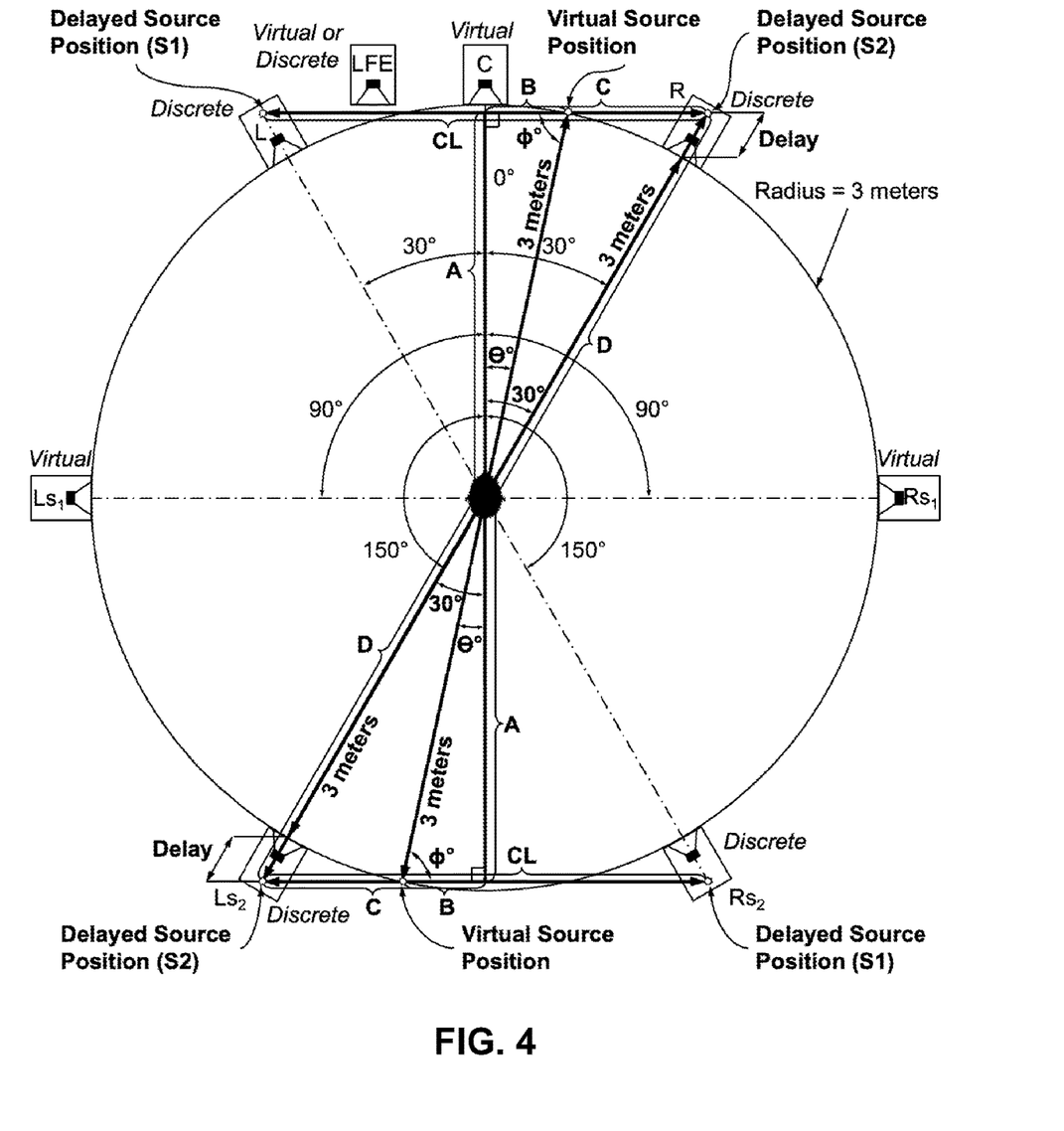
FIG. 4 provides a schematic image demonstrating the present head-tracking design for virtual sources located front and rear of the listener.
Figure 5:
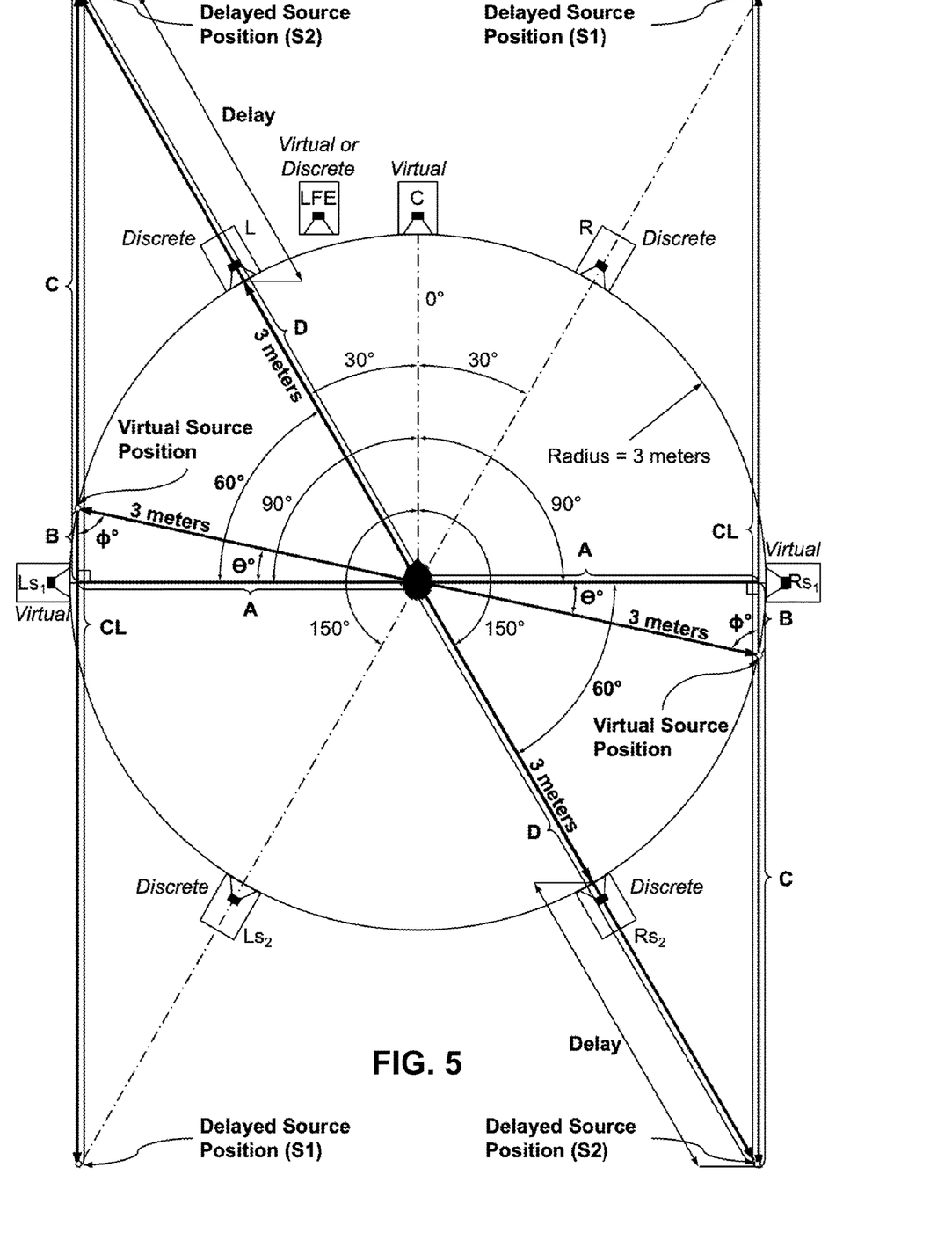
FIG. 5 provides a schematic diagram demonstrating the present head-tracking design for virtual sources located at sides (right and left) of the listener.

FIG. 4 and FIG. 5 illustrate the geometrical relationships used to calculate signal processor lookup values for delay and gain/attenuation for all positions of virtual sources located on a standard ITU-R (BS.775-2) 7.1 channel setup, with 3 meter radius. FIG. 4 specifically provides a schematic image demonstrating the present head-tracking design for virtual sources located front and rear of the listener. FIG. 5 specifically provides a schematic diagram demonstrating the present head-tracking design for virtual sources located at sides (right and left) of the listener. The process for calculation will be conceptually similar for other radii and setup configurations (2-8 or more channels). As mentioned, values can be precalculated and stored in a lookup table within memory or calculated in real-time using a simple algorithm running in a system processor (MCU 140) or signal processor 170 to execute the mathematical functions. FIGS. 4, 5, and the calculation methodology are identical for either lookup table data or real-time algorithms running in processors.

Calculation of delay and gain/attenuation values would proceed in exactly the same manner for all virtual source locations shown in FIGS. 4 and 5, as demonstrated hereafter. θ is defined as the angle of rotation of virtual source about the central axis (half-way) between source positions, S1 and S2. Ψ is defined as half the angular separation (degrees) between source positions, S1 and S2. It follows that φ=180°−Θ; A=3×sin (φ); B=A/tan (φ); and D=A/cos (ψ); with R=radius of listening setup unit circle or 3 meters for ITU-R (BS.775-2) configuration and $V_s$=velocity of sound in air at room temperature or, 343.21 m/sec at 20° C.

The delay of S1, S2 is calculated using equation 1 below:

$$\text{Delay}=(D-R)/V_s \text{ or } (D-3)/343.21 \tag{Eq. 1}$$

It follows that C=A×tan (ψ); CL=2×C; E=C+B; F=E/CL; and G=1−F. The gain/attenuation (levels) of S1 and S2 are determined as follows:

Gain/Attenuation (Level) of S1 is calculated as
$$\text{Level}=20\times\text{Log}(G) \tag{Eq. 2}$$

Gain/Attenuation (Level) of S2 is calculated as
$$\text{Level}=20\times\text{Log}(F) \tag{Eq. 3}$$

Because the present head-tracking design does not add new signal processor functions, and only alters existing processing coefficients for gain/attenuation, delay and mixing, the degree of processing is minimized and identical in complexity to the condition whereby head-tracking is disabled or turned off. The signal processing (DSP or analog) functions are identical since some virtual sources are required for standard multichannel playback even at 0° head orientation or without head-tracking functionality.

The simplified signal processing (DSP or analog) topology differs significantly from complex head-tracking solutions that need to dynamically alter HRTFs (head-related transfer functions), query a large database of predetermined HRTFs or switch large banks of digital filters—all of which can compromise audio quality or require significant processing load (which also may increase cost and power requirements) or add significant processing delay.

It is recommended that double-precision, high sample rate, fixed-point processing be utilized for DSP implementations of the design in order to assure preservation of the source audio quality.

The present head-tracking design allows for high performance headphones and headsets that employ concepts, for example, those outlined within co-pending utility patent application Ser. No. 16/998,206, filed Aug. 20, 2020, "Headphone Device for Reproducing Three-Dimensional Sound Therein, and Associated Method", to maintain realistic, accurate, three-dimensional sonic imaging that is fully externalized (extends outside of the listener's head) under real-world operating conditions, despite moderate changes in head position. The proposed head-tracking design will keep the sonic (spatial) image oriented properly (forward and centered at 0°) despite head rotations of ±60°. Furthermore, the present head-tracking design is perceptually transparent, avoiding distortion or exaggeration of the spatial information and preserving the fidelity and quality of the audio source material.

The present head-tracking design could be used in conjunction with the concepts outlined within co-pending utility patent application Ser. No. 16/998,206, filed Aug. 20, 2020, entitled "Headphone Device for Reproducing Three-Dimensional Sound Therein, and Associated Method", together can achieve ultra-high performance in headphones and headsets for a wide range of applications, including studio monitoring, virtual/augmented reality, home theater, gaming, music, aerospace/military trainers, etc.

I claim:

1. A head-tracking method intended for headphone-type audio reproduction devices that utilize a dynamic (real-time variable) signal processing mix engine, the method comprising the steps of:

mixing audio input data or channels to discrete audio reproduction channels present within an audio reproduction device to output a sonic image, where the discrete audio reproduction channels feed or drive an associated audio transducer or speaker of the audio reproduction device, to alter location of the audio input data or channels perceived in 3D space, in a manner compensating for relative head movement, referred to herein as a compensatory manner, based upon provided user head location data, wherein phase (delay) of the audio input data or channels is altered to shift the location of the sonic image perceived in 3D space, in a compensatory manner that correlates to a desired location relative to a designated reference point of the audio reproduction device, wherein an amplitude of the audio input data or channels is altered to shift the location of the sonic image perceived in 3D space, in a compensatory manner that correlates to the desired location relative to the designated reference point of the audio reproduction device, wherein the phase of the audio input data or channels is changed through use of new constant delay values applied as a time delay stage prior to a standard audio mixer topology, wherein the amplitude of the desired audio input data or channels is changed through use of new gain/attenuation values that are applied to the standard audio mixer topology, and wherein the altering of the phase (delay) of the audio input data or channels is performed by use of a constant delay function, which is used for each of the desired audio input data or channels that is independently varied based on current user head location data.

2. The method of claim 1, wherein the signal processing mix engine is an analog mix engine.

3. The method of claim 1, wherein the signal processing mix engine is a digital signal processing mix engine.

4. The method of claim 1, wherein the audio input data or channels are real audio input data or channels.

5. The method of claim 1, wherein the audio input data or channels are virtual audio input data or channels.

6. The method of claim 1, wherein the amplitude of the audio input data or channels is altered using standard "Phantom Channel" mixing techniques.

7. The method of claim 1, wherein the new gain/attenuation values, parameters or coefficients are calculated in real time.

8. The method of claim 1, wherein the new gain/attenuation values, parameters or coefficients are pre-calculated.

9. The method of claim 1, wherein the new constant delay values, parameters or coefficients are calculated in real time.

10. The method of claim 1, wherein the new constant delay values, parameters or coefficients are precalculated.

11. The method of claim 1, wherein the new gain/attenuation values are processing coefficients when the signal processing mix engine is a digital signal processing (DSP) mix engine.

12. The method of claim 1, wherein the new constant delay values are processing coefficients when the signal processing mix engine is a digital signal processing (DSP) mix engine.

13. The method of claim 1, further comprising varying multiple gain/attenuation functions for each of the audio input data or channels based on current user head location data, prior to or as part of the mixing step, where mixing functions feed the discrete audio reproduction channels present within the audio reproduction device.

* * * * *